United States Patent

Eyerer et al.

Patent Number: 5,395,412
Date of Patent: Mar. 7, 1995

[54] METHOD AND APPARATUS FOR THE TREATMENT OF FIBER PIECES

[75] Inventors: Peter Eyerer, Ostfildern; Peter Stockmayer, Stuttgart, both of Germany; Rolf Weigele, Steckborn, Switzerland

[73] Assignee: Poly ID AG, Steckborn, Switzerland

[21] Appl. No.: 90,033

[22] PCT Filed: Jan. 14, 1992

[86] PCT No.: PCT/DE92/00021
 § 371 Date: Jul. 9, 1993
 § 102(e) Date: Jul. 9, 1993

[87] PCT Pub. No.: WO92/13124
 PCT Pub. Date: Aug. 6, 1992

[30] Foreign Application Priority Data

Jan. 15, 1991 [DE] Germany ............ 41 00 925.8

[51] Int. Cl.⁶ ............ C03B 37/025; C03B 19/10
[52] U.S. Cl. ............ 65/465; 65/21.3; 65/142; 65/508; 65/524; 264/15; 264/210.8
[58] Field of Search ............ 65/2, 12, 11.1, 10, 65/10.2, 112, 21.3, 269, 142; 264/15, 210.8

[56] References Cited

U.S. PATENT DOCUMENTS

| | | | |
|---|---|---|---|
| 3,469,479 | 9/1969 | Calemard | 83/16 |
| 3,607,165 | 9/1971 | Guthrie | 65/10.2 |
| 3,684,474 | 8/1972 | Chisholm | 65/112 X |
| 3,883,334 | 5/1975 | Cassidy | 65/2 |
| 4,158,555 | 6/1979 | Kallenborn | 65/2 |
| 4,268,294 | 5/1981 | Laughlin et al. | 65/10 |
| 4,381,330 | 4/1983 | Gotomyo et al. | 428/218 |
| 4,840,755 | 6/1989 | Nakazawa et al. | 264/15 |

FOREIGN PATENT DOCUMENTS

| | | | |
|---|---|---|---|
| 000714 | 3/1979 | European Pat. Off. | B29D 3/02 |
| 0294023 | 4/1988 | European Pat. Off. | D02J 13/00 |
| 812610 | 3/1950 | Germany | B29C 35/06 |
| 2114483 | 3/1971 | Germany | D01G 1/00 |
| 3407820 | 3/1984 | Germany | G02B 6/32 |
| 3838247 | 11/1988 | Germany | D04H 1/54 |
| 3038327 | 7/1989 | Japan | B29D 31/00 |

Primary Examiner—Robert L. Lindsay
Attorney, Agent, or Firm—Flynn, Thiel, Boutell & Tanis

[57] ABSTRACT

A method and apparatus for the treatment of fiber pieces, with which the fiber pieces (24) in a gas/solid mix are fed through a transport line (11) into a heating device (14). Inside the heating device (14) the exposed ends of the fiber pieces (24) are rounded off and/or thickened. Subsequent to the treatment in the heating device the treated fibers (25) flow into a feed line and from there into a separating device (18), in which the gas/solid mix is separated. The fiber bits produced according to the invented method improve the mechanical quality and characteristics of fiber composite materials considerably. By utilizing the described device the invented method can be carried out most economically. (FIG. 1)

15 Claims, 2 Drawing Sheets

METHOD AND APPARATUS FOR THE TREATMENT OF FIBER PIECES

BACKGROUND OF THE INVENTION

The invention is based on a method for the treatment of fiber pieces of all shapes on an industrial scale, in particular long fibers, short fibers or the like, which are added to other materials as reinforcing material.

It is known in the art how to produce composite materials, in particular fiber reinforced materials, that consist of a matrix and reinforcing material embedded in the matrix. The incorporated material of such composite materials can consist of fiber bits that are thickened and rounded-off at the ends. Such composite material has higher quality mechanical characteristics. When the corners are rounded off, there is very little or no stress concentration at the ends of the fiber pieces, which means that cracks only appear at higher loads. This knowledge is based on the fact that incorporated fibers with rounded and/or thickened ends, rather than the sharp-edged ends that can be caused by breaking, cutting or the like exhibit smaller tension peaks in their surrounding matrix in the vicinity of these ends and therefore have lower stress concentration. Even though these advantages are known in the art, it has not been possible in the past to economically mass-produce fiber pieces, especially long fibers, short fibers or the like, and especially those made of glass fiber material, that have the desired rounded off and/or thickened ends.

It is the underlying purpose of the invention to therefore provide a method and/or an apparatus that facilitates the commercial treatment of fiber pieces with rounded and/or thickened exposed ends.

SUMMARY OF THE INVENTION

This purpose is achieved with the method according to the invention for the commercial treatment of fiber pieces in particular of long fibers, short fibers or the like, whose exposed ends are subjected in a gas/solid flow to a thermal treatment within the range of the melting temperature of those fibers, and the ends of the individual fibers are rounded off and/or thickened so that, after the thermal treatment, the fibers are still individually separate within a pile. This purpose is also achieved in accordance with an apparatus for the treatment of fiber pieces in particular characterizing a transport line exhibiting a fiber adding nozzle and a first injector whereby a heating device is allocated to the transport line and the heating device is followed by a feed line which is connected to a separating device. By creating the rounded off and/or thickened ends of the fiber pieces by means of a thermal treatment in a gas/solid stream in the vicinity of the melting temperature of the fibers, it is possible to commercially produce single fibers that do not adhere to each other, at low cost and of consistent quality. If fibers that have been produced in accordance with the inventive method and/or by the apparatus in accordance with the invention are used in composite materials or other components, the quality of the mechanical characteristics and features of these material will be considerably improved.

The preferred configuration in accordance with the invention is to feed the fibers that are to be treated into a transport line into which, via a first injector, a transporting gas flows whereby the transporting gas and the fibers form a gas/solid mix. The function of the gas in the gas/solid mix can also be taken over by a liquid or another solid matter, such as a flammable or soluble solid.

This has the advantage that the pile of loose fibers can be transported smoothly and can be exposed to an intensive heat exchange during the thermal treatment. The single fibers can be accelerated inside the transport line via the injector which can be configured in the form of a nozzle. Thereby it is possible to have the transporting gas already flow into the transport line at a higher temperature.

In a preferred procedural step, the fiber/transporting gas mix is subjected to a controllable and adjustable direct heat treatment in the annulus of a burner.

This has the advantage that the thermal treatment of each fiber can be conducted very effectively and with almost no waste.

In another preferred procedural step, the thermally treated fiber/transporting gas mix flows into a feed line, where it is further accelerated, or cooled.

A flow pipe that, if desired is coolable, may be installed inside the burner. This flow pipe allows for an even temperature profile in the entire annular passage of the burner. One end of the flow pipe extends into the transport line and its other end extends into the feed line. In order to avoid a hold-up of fiber material in the area of the heating device, it is advantageous to have low pressure in the feed line area next to the area of heat treatment. Due to this low pressure the treated fiber material is drawn into the feed line and can be cooled there or subjected to another treatment. Inside the feed line the fibers can be subjected to an additional surface coating (coating steam). If the exposed end of the feed line is formed with a funnel-shaped expansion, the low pressure can be reduced. This way the whole material can be transferred from the transport line to the feed line without losses.

If the exposed end of the feed line is tapered towards the annular burner, then the gas/solid flow in that area can be more or less completely separated. This makes it possible to produce fractions of the same particle shape. Therefore it becomes easy for instance to commercially separate fibers of the same length or with another geometry.

The cooled, or additionally treated fiber material is transported from the feed line to a separating device, in which the feeding gas is separated from the single fiber bits. The feeding gas can be fed to a circulation and/or a cleaning stage as required. The accumulated fiber pieces with rounded-off or thickened ends that have been separated in the separating device are suitable for mixing with materials to improve their quality or their properties.

It is especially advantageous to carry out the treatment in a facility whose transport line and feed line have a tubular shape through which the gas/solid mix flows. By means of a heating device placed between the transport line and the feed line the fibers are treated to exhibit a spherical shape or rounded-off or thickened ends in their final stage.

If an annular burner is placed between the transport line and the feed line through which the gas/solid mix directly flows, the gas/solid mix can, in a very short time, be heated up to temperatures at which the ends of the fibers are melted, i.e. thickened or rounded off. Shorter fiber pieces are melted into spherical shapes.

If a flow pipe is placed inside the annulus, so that the gas/solid mix flows only through an annular gap and is exposed to an open flame inside that annular gap, then undesired temperature gradients can be largely eliminated in that annular passage.

The gas/solid flux can be transported particularly advantageously through the transport line and the feed line as well as through the heating facility, if an additional injector, which creates low pressure at the entrance of the feed line, is installed inside the feed line. The treated fiber pieces can be cooled by the feeding gas flowing in through this second injector. The cooling can also be effected by cooling the feed line itself. In the separating device, which is connected to the feed line, the treated fiber pieces can be separated from the feeding gas.

The length of the transport line or feed line must be adjusted to individual requirements, so that the length of these lines, or their diameters are given by the calculated or modelled required average dwell-time of the gas/solid mix inside the device.

Clearly, the inventive concept also includes the treatment of particles of all types shaped like plates, grains, or disks. All these particles can be rounded off with the invented method and/or apparatus, so that they can be utilized more profitably for different technical applications. It is also possible to create defined bends through one-sided heating of the fiber bits.

Additional advantages are shown in the description and the enclosed drawings. According to the invention the characteristics listed above and below can also be used individually or collectively in any desired combination. The embodiments mentioned are not to be understood as an exhaustive listing, but rather have exemplary character.

BRIEF DESCRIPTION OF THE DRAWINGS

The invention is depicted in the drawing and is demonstrated with the help of embodiments. The drawings show.

DETAILED DESCRIPTION

Figure 1:
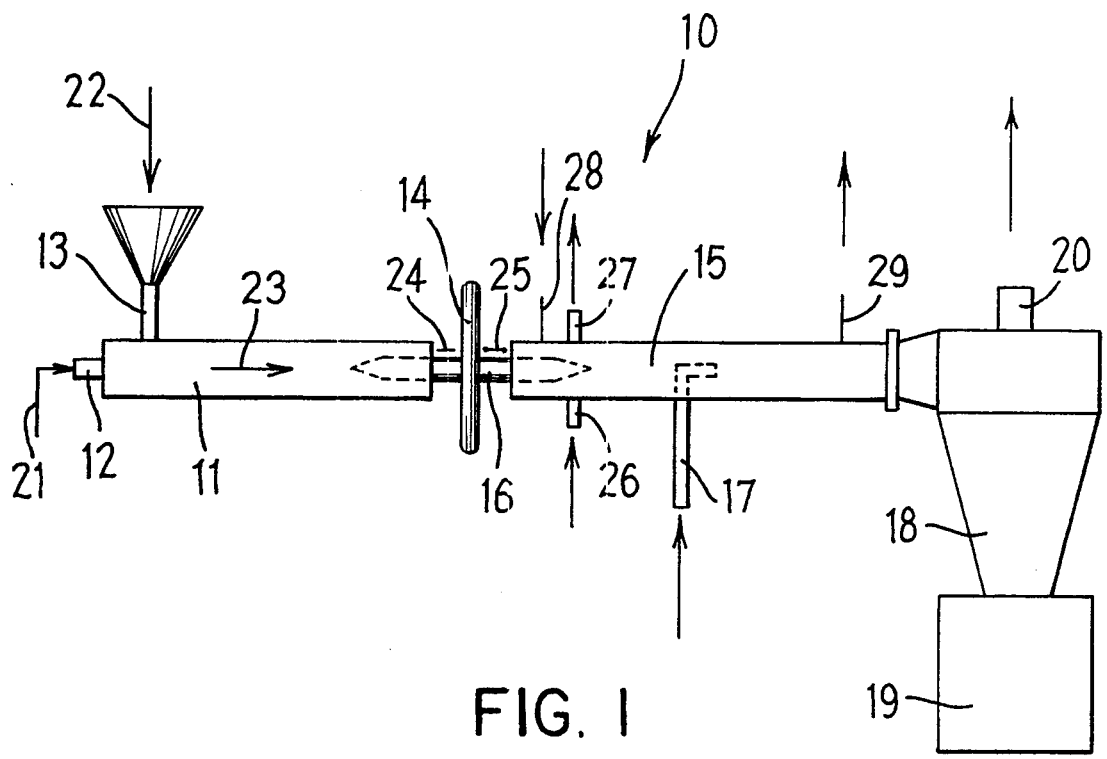
FIG. 1 an exemplary construction of a device for the execution of the invented method.

The individual figures in the drawing are very schematic depictions of the object of invention and are not to be considered as being true to scale. The objects in the individual figures are depicted to clearly show their construction.

FIG. 1 illustrates a device for the fiber treatment 10, which shows a transport line 11, to which a first injector 12 is connected and is provided with an adding nozzle 13. Feeding gas flows through the first injector 12 into the pipe-shaped transport line 11, and the fiber pieces that are available as bulk material and that are to be treated are added through the adding nozzle 13 into the transport line 11. The mass flow rate of the feeding gas, or of the bulk fiber material is calculated from the required average dwell-time in the transport line 11 and/or a heating device 14. The gas/solid mix created in the transport line 11 is fed into the heating device 14, which is either adjacent to the transport line 11, as shown in the figure, or which can also be part of the transport line 11. The gas/solid mix flows through the heating device 14 and then enters a feed line 15. The feed line 15 is also shaped like a pipe. FIG. 1 depicts a flow body 16 concentric to an annular heating device 14. The gas/solid mix flows through the heating device 14 in an annular gap formed by the flow body 16 and the heating device 14.

Feeding gas flows through a second injector 17 inside the feed line 15 into the feed line 15. The feeding gas creates low pressure at the open end of the feed line 15 near the heating device 14, so that the gas/solid mix is drawn into the feed line.

The feed line 15 runs into a separating device 18, in which the gas/solid mix is separated. The treated fiber bits with rounded or thickened ends or of spherical shape are collected in a collecting vessel 19, and the feeding gas flows out of the separating device 18 through a gas outlet nozzle 20. If required, the feeding gas flowing out of the gas outlet nozzle 20 can be caused to circulate or directed for further cleaning or conditioning (thermal).

At the first injector 12 the feeding gas flows in the direction of the arrow 21 into the transport line 11. The arrow 22 shows the feeding of the fibers in the figure. As soon as the fiber bits and the feeding gas have mixed, the gas/solid mix is directed in direction of the arrow 23 through the transport line 11 to the heating device 14. FIG. 1 depicts, by way of example, a single fiber piece 24 that is to undergo thermal treatment. 25 depicts a treated fiber piece exhibiting rounded or thickened exposed ends.

The flow body 16 can be cooled through coolant addition and extraction nozzles 26, 27. In this area the flow body 16 is kept concentric, also in the feed line 15. If the flow body 16 is held only in the feed line 15, this ensures that the flow body 16 does not create additional turbulence in the gas/solid mix inside the transport line 11.

18 depicts a coolant entrance and 29 a coolant exit on the feed line 15, so that the feed line 15 can be cooled if required. The direction of flow of the coolant is indicated by arrows. Cooling can be done in the direction of or against the current as required. The main reason for the cooling is to prevent the fibers from sticking or fusing to another or bonding to the inner surface of the feed line.

Figure 2:
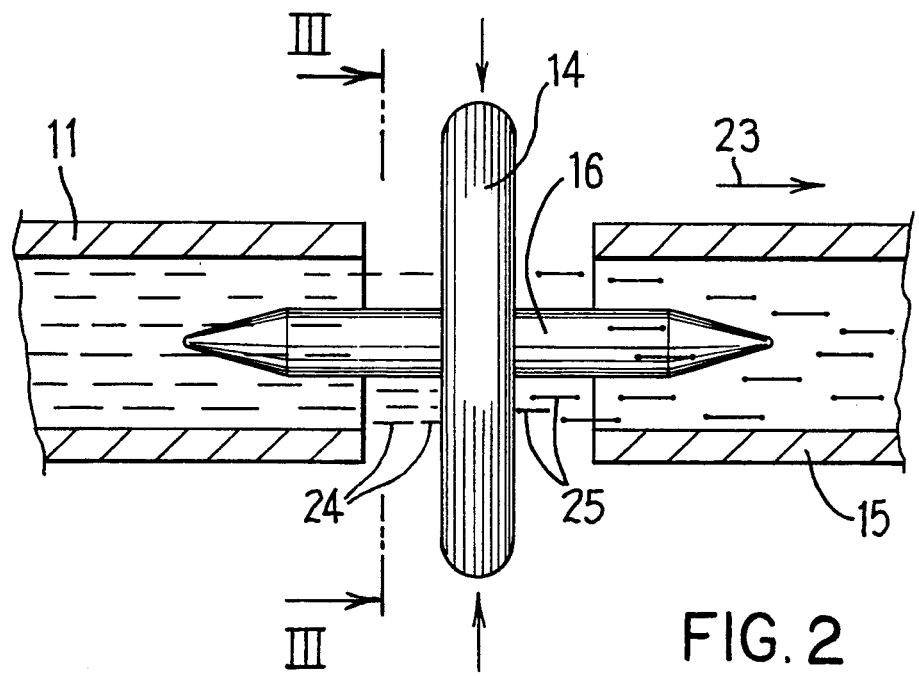
FIG. 2 a section of FIG. 1, partly cut with untreated and with treated fibers.

FIG. 2 shows an enlarged cut of pipe-shaped sections of the transport line 11 and the feed line 15. The heating device 14 is placed between the two lines. The heating device 14 is an annular burner and the fibers flow directly through its flames. The flow body 16 is spike-shaped and its ends are either rounded or pointed, as desired. 23 indicates the direction of flow of the gas/solid mix. Untreated fiber pieces 24 exhibit rounded and/or thickened exposed ends after leaving the annular burner. Those fibers are labelled 25.

Figure 3:
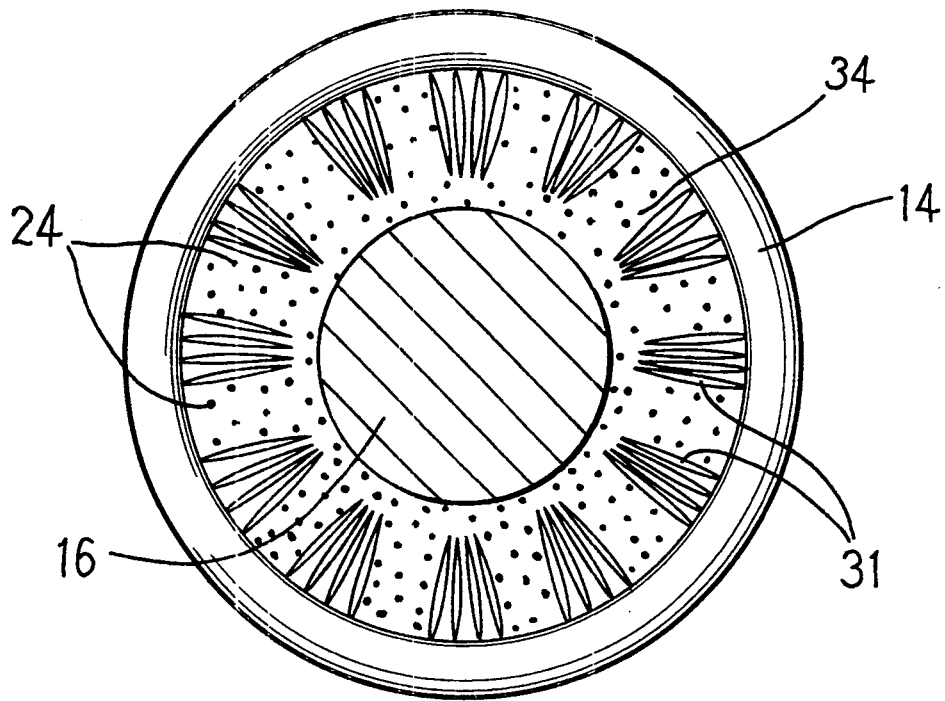
FIG. 3 a section III—III of FIG. 2.

FIG. 3 shows a cut III—III of FIG. 2. The heating device 14 is designed as an annular burner and the open flames 31 cover the total periphery of the annular burner and point towards the inside. The flow body 16 is depicted cut in the figure and the fiber pieces 24 that are to be treated are depicted in the shape of dots inside the annular burner 34.

Figure 4:
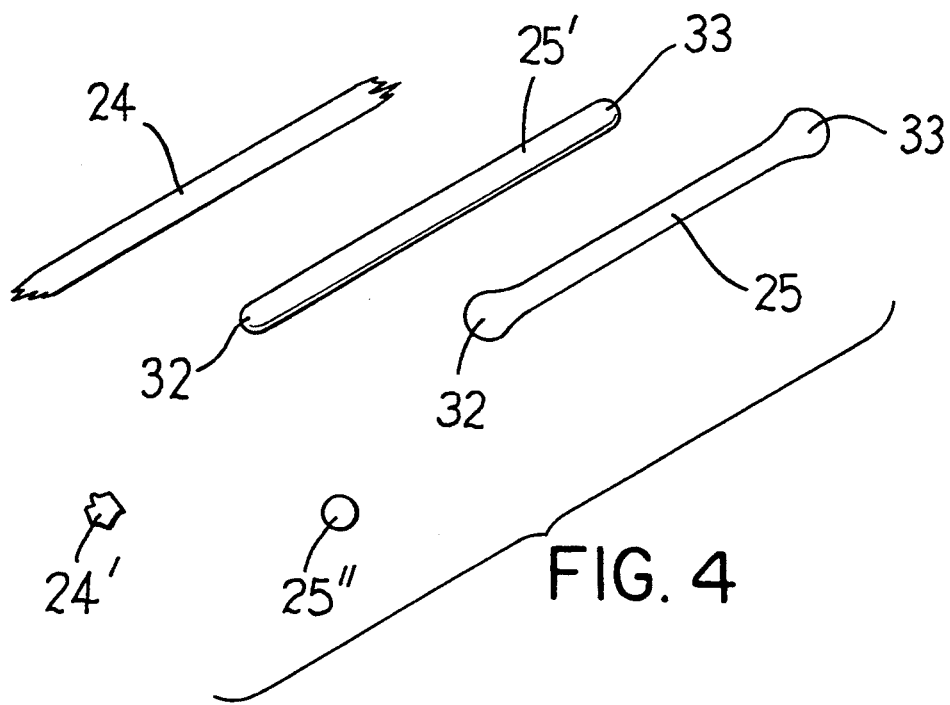
FIG. 4 untreated and treated fiber pieces.

FIG. 4 shows a very schematic depiction of single fiber pieces 24, 24' and 25, 25', 25''. The fiber piece 24 has jagged exposed ends, while the treated fiber piece 25, 25' has club-shaped or simply rounded ends 32, 33. If fiber pieces 24 are transported through an annulus 34 of FIG. 3, they will exhibit rounded and/or thickened ends 32, 33. Even particles 24' with a sharp-edged surface can be completely or partly rounded off using the thermal treatment in accordance with the invention.

A temperature, at which the subject non-melting fiber pieces exhibit a greatly reduced viscosity, can also be considered a melting temperature in the context of the inventive method. The underlying concept of the invention is that during the partial or complete melting of the ends of fiber pieces 24 these ends round themselves off and/or thicken themselves, due to the large surface tension of the material, in particular glass, of the fiber pieces 24. The rounded and/or thickened ends 32/33 of fiber pieces 25 make these fiber pieces 25 especially suitable for the production of fiber reinforced materials and parts whose mechanical quality characteristics, such as modulus of elasticity and impact value, are improved about 70% due to such fiber pieces 25. The reason for this is the fact that the fiber pieces 25 with rounded and/or thickened ends 32, 33 instead of sharp-edged ends, resulting for instance from breaking or cutting, cause reduced tension peaks at their ends in their surrounding matrix and therefore result in reduced stress concentration.

Inside the heating device 14 the fiber pieces 24 are subjected to temperatures within the range of the melting temperature of the particles or fibers. The melting temperature created in the heating device 14 or in several heating devices placed in series one after another essentially depends on the treatable components of the fiber pieces. Higher temperatures may also be considered depending on the material of the fiber pieces.

Clearly, not only fiber pieces 24 made of glass fibers but also made of other materials may be treated accordingly, for example those made of cross-linked, non-meltable base materials or made of meltable synthetics. This includes fiber pieces made of polyamide, aramide, polyester, polyethylene or the like. Stone fibers, quartz grains, metal particles or metal fibers can also be treated within the framework of the invention. It is advantageous if the fiber pieces that are to be treated exhibit a diameter within the range of 5 to 55 $\mu$m, preferably a diameter within the range of 10 to 15 $\mu$m. If the length of the fiber pieces is less than 0.1 mm, particularly glass powder, they are melted into spherical particles when flowing through the heating device. Spherical particles in a matrix of a fiber composite have the advantage that the stress concentration of the composite, especially of the part made of the composite, is reduced even further.

What is claimed is:

1. A method for the commercial treatment of fiber pieces having exposed ends comprising the steps of: suspending and transporting the fiber pieces in a stream of moving gas to form a gas/solid flow; and subjecting, in the gas/solid flow, the exposed ends to a thermal treatment within a range of the melting temperature of the fibers to thicken the ends of the individual fibers, whereby, after the thermal treatment, the fibers are still individually separate within the gas/solid flow.

2. The method in accordance with claim 1, wherein the fibers are fed into a transport line into which a feeding gas flows through a first injector and the feeding gas forms the gas/solid flow with the fibers.

3. The method in accordance with claim 2, wherein the gas/solid flow is accelerated inside the transport line.

4. The method in accordance with claim 2, wherein the gas/solid flow is subjected to a direct heating treatment inside an annulus of a burner.

5. The method in accordance with claim 2, further comprising feeding the thermally treated gas/solid flow into a feed line.

6. The method in accordance with claim 2, further comprising subjecting the gas/solid flow to a flow body in the area of the thermal treatment.

7. The method in accordance with claim 6, further comprising cooling the flow body.

8. The method in accordance with claim 5, further comprising creating a low pressure in an area where the gas/solid flow enters the feed line.

9. The method in accordance with claim 1, further comprising directing, after the thermal treatment, the gas/solid flow into a separating device.

10. An apparatus for the treatment of fiber pieces comprising, a transport line having a fiber adding nozzle for introducing fiber pieces into the transport line and a first gas injector for introducing gas in the transport line to form a stream of moving gas in which the fiber pieces are suspended and transported as a gas/solid flow through the transport line, a heating device downstream of the transport line, said heating device being so disposed relative to the transport line as to heat the fiber pieces in the gas/solid flow in a range of the melting temperature of the fiber pieces to thicken the ends of individual fiber pieces, and a feed line disposed downstream of the heating device for receiving the gas/solid flow, said feed line being connected to a separating device for removing the fiber pieces having the thickened ends from the gas/solid flow.

11. The apparatus in accordance with claim 10, wherein the heating device comprises an annular burner placed at a distance from and between the transport line and the feed line, the annular burner comprising a concentrically arranged flow pipe.

12. The apparatus in accordance with claim 10, wherein the feed line has a second gas injector for injecting gas in the feed line to draw the gas/solid flow into the feed line.

13. The apparatus in accordance with claim 10, further comprising a plurality of heating devices between the transport line and the feed line.

14. The apparatus in accordance with claim 10, further comprising a flow body located near the heating device, wherein the feed line, the separating device, and/or the flow body are coolable.

15. The method of claim 5, further comprising cooling the feed line.

* * * * *